United States Patent [19]

Chen

[11] Patent Number: 5,647,828
[45] Date of Patent: Jul. 15, 1997

[54] EXERCISER WHEEL ASSEMBLY WITH REPLACEABLE WHEEL RING

[76] Inventor: Ping Chen, No. 29, Nan-Mei St., Nan-Tun Dist., Taichung City, Taiwan

[21] Appl. No.: 683,235

[22] Filed: Jul. 18, 1996

[51] Int. Cl.⁶ .......................... A63B 21/00; B60B 27/00; B60B 37/00

[52] U.S. Cl. .......................... 482/132; 482/148; 301/111; 301/112

[58] Field of Search .............................. 16/45, 18 R, 97; 301/111, 112, 120, 122; 446/465; 482/132, 148

[56] References Cited

U.S. PATENT DOCUMENTS

| 4,193,639 | 3/1980 | Pauley et al. | 446/465 |
| 4,664,252 | 5/1987 | Galbraith | 301/122 |
| 4,722,115 | 2/1988 | Yang | 16/45 |
| 5,222,786 | 6/1993 | Sovis et al. | 301/122 |

FOREIGN PATENT DOCUMENTS

| 4189602 | 7/1992 | Japan | 16/45 |
| 28760 | 12/1906 | United Kingdom | 301/111 |

*Primary Examiner*—Richard J. Apley
*Assistant Examiner*—William LaMarca
*Attorney, Agent, or Firm*—Ladas & Parry

[57] ABSTRACT

A wheel assembly for an exerciser includes a tubular ring-mounting member having a plurality of axially extending slots at an open inner end portion thereof so as to define a plurality of tapered flexible jaws. A wheel-bearing tube has an open outer end inserted into the ring-mounting member. A retaining ring has an internal thread unit for engaging the external thread unit of the jaws, and an inclined pressing section for pressing the jaws against the wheel-bearing tube so as to fasten the ring-mounting member to the tube. A wheel ring is sleeved on the ring-mounting member between an inner outward flange unit on the jaws and an outer outward flange unit of the ring-mounting member. The inner outward flange unit can be compressed so as to permit entry of the wheel ring into the space between the inner and outer outward flange units. The wheel ring may be provided with a key secured to the inner surface thereof and engaging one of the axially extending slots of the ring-mounting member so as to prevent relative rotation between the wheel ring and the ring-mounting member when the exerciser is in use. When it is desired to transport the exerciser, the wheel ring on which no key is provided can be mounted rotatably on the ring-mounting member.

7 Claims, 7 Drawing Sheets

EXERCISER WHEEL ASSEMBLY WITH REPLACEABLE WHEEL RING

BACKGROUND OF THE INVENTION

1. Field of the Invention

This invention relates to a wheel assembly for an exerciser, more particularly to an exerciser wheel assembly wherein a fixed wheel ring or a rotatable wheel ring can be easily mounted.

2. Description of the Related Art

The improvement of this invention is directed to the conventional exerciser wheel assembly shown in FIG. 1 which includes a roller 2. A lock bolt 3 passes through a central hole 2a in the roller 2 to engage the threaded hole 1b in an end portion 1a of a wheel-bearing tube 1, thereby mounting rotatably the roller 2 on the tube 1. Normally, a conventional exerciser is equipped with two fixed wheels on one side, and with two rotatable wheels on the opposite side. In use, the exerciser cannot stand stationarily on the floor due to the presence of the rotatable wheels. Furthermore, when it is desired to move the exerciser on the floor, the side of the exerciser that is equipped with the fixed wheels must be raised so that the rotatable wheels can move on the floor while the exerciser is being pushed, thereby causing inconvenience to the user.

SUMMARY OF THE INVENTION

An object of this invention is to provide a wheel assembly for an exerciser in which a fixed wheel ring or a rotatable wheel ring can be easily incorporated. Thus, the exerciser can be equipped with four fixed wheel rings in use, and with four rotatable rings during transport.

According to this invention, a wheel assembly for an exerciser includes a tubular ring-mounting member having a plurality of axially extending slots at an open inner end portion thereof so as to define a plurality of tapered flexible jaws, each of which is located between an adjacent pair of the slots. A wheel-bearing tube has an open outer end inserted into the ring-mounting member. A retaining ring has an internal thread unit which engages the external thread unit on the jaws of the ring-mounting member, and an inclined pressing section which presses the jaws against the wheel-bearing tube so as to fasten the ring-mounting member to the tube. A wheel ring is sleeved on the ring-mounting member between an inner outward flange unit on the jaws and an outer outward flange unit of the ring-mounting member. The inner outward flange unit can be compressed so as to permit placing of the wheel ring in the space between the inner and outer outward flange units. The wheel ring may be provided with a key which is secured to the inner surface thereof so as to engage one of the axially extending slots of the ring-mounting member in order to prevent relative rotation between the wheel ring and the ring-mounting member when the exerciser is in use. When it is desired to transport the exerciser, the wheel ring on which no key is provided can be mounted rotatably on the ring-mounting member.

BRIEF DESCRIPTION OF THE DRAWINGS

Other features and advantages of this invention will become apparent in the following detailed description of the preferred embodiments of this invention with reference to the accompanying drawings, in which.

DETAILED DESCRIPTION OF THE PREFERRED EMBODIMENTS

Figure 1:
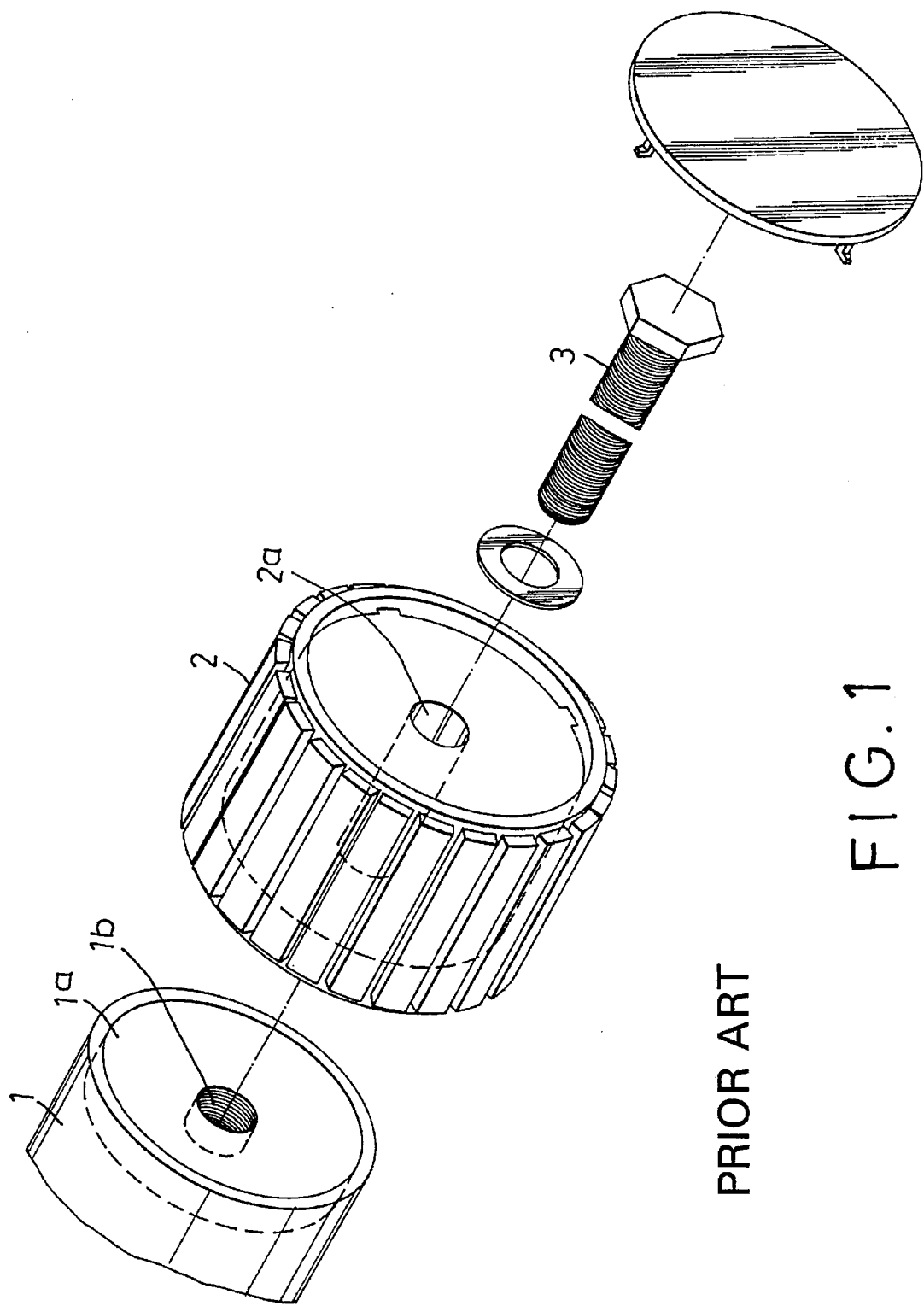
FIG. 1 is an exploded view of a conventional wheel assembly for an exerciser.
Figure 2:
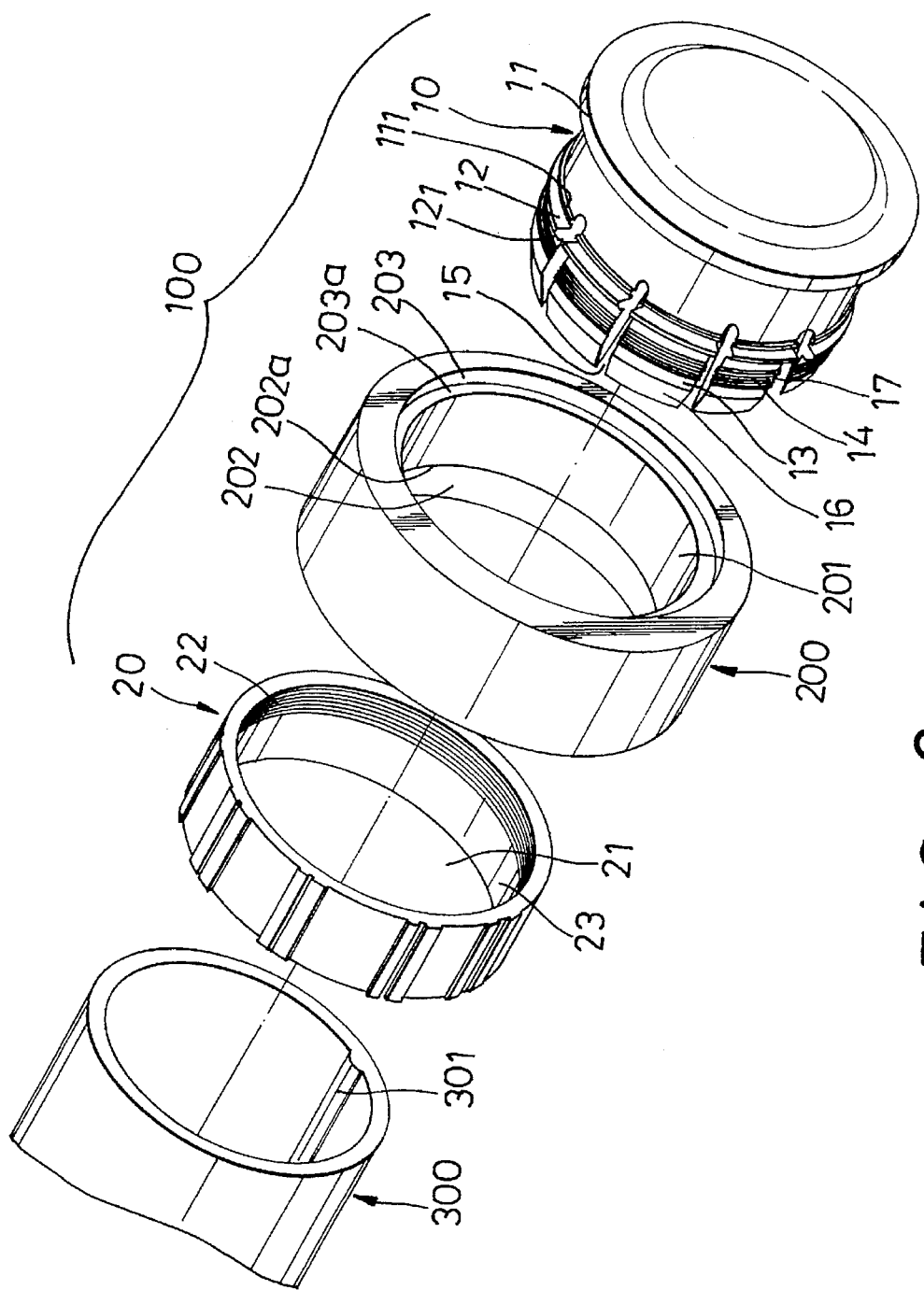
FIG. 2 is an exploded view of a rotatable wheel assembly for an exerciser according to this invention, the wheel assembly being provided with a rotatable wheel ring.
Figure 4:
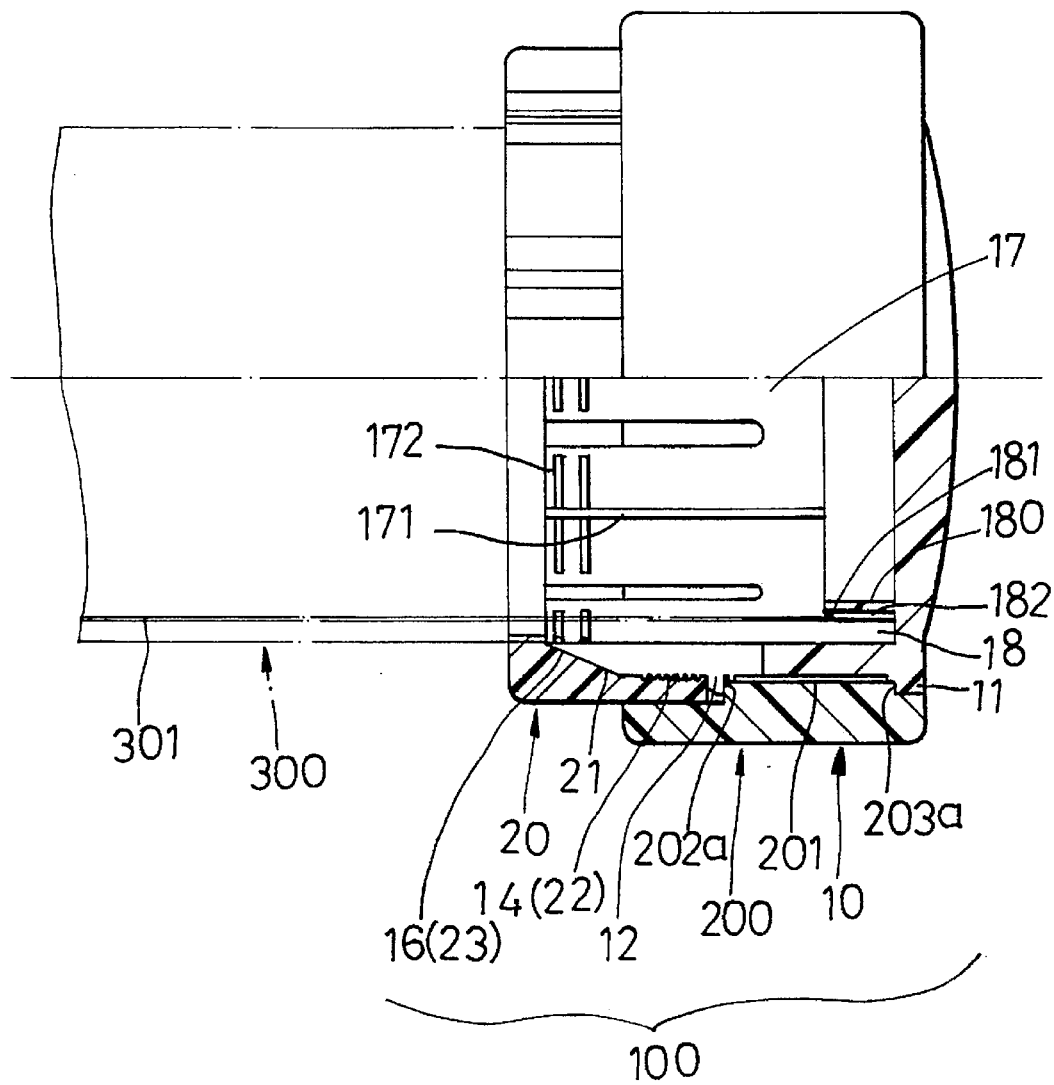
FIG. 4 is a schematic, partly sectional view showing the rotatable wheel assembly provided with the rotatable wheel ring according to this invention.

Referring to FIGS. 2 and 4, a rotatable wheel assembly for an exerciser according to this invention includes a mounting unit 100 consisting of a tubular ring-mounting member 10 and a retaining ring 20, and a rotatable wheel ring 200. The tubular ring-mounting member 10 is sleeved on an open outer end of a wheel-bearing tube 300 of the exerciser. The rotatable wheel ring 200 is sleeved on the right portion of the ring-mounting member 10. The retaining ring 20 is sleeved on the left portion of the ring-mounting member 10.

The ring-mounting member 10 has an open inner end and a closed outer end which has an end wall formed with an outer outward flange unit 11 that projects radially and outwardly therefrom. An inner outward flange unit 12 projects radially and outwardly from the middle portion of the peripheral surface of the ring-mounting member 10 so as to define a ring-mounting space between the outer outward flange unit 11 and the inner outward flange unit 12. As illustrated, the inner outward flange unit 12 increases gradually in outer diameter from an outer end away from the ring-mounting space to an inner end adjacent to the ring-mounting space, thereby defining an inclined peripheral surface 121 of the inner outward flange unit 12 for assisting the rotatable wheel ring 200 when sliding over the peripheral surface 121 of the inner outward flange unit 12 into the ring-mounting space between the outward flange units 11 and 12.

The peripheral wall of the ring-mounting member 10 further has two axially spaced-apart small flanges 111 that are located between the outward flange units 11 and 12 and that have an outer diameter smaller than those of the outward flange units 11 and 12, and a plurality of axially extending jaws 13 which are formed with an external thread unit 14 adjacent to the inner outward flange unit 12, and which are defined by a plurality of axially extending slots 15. The slots 15 are formed through the peripheral wall of the ring-mounting member 10 and are open at the open inner end of the ring-mounting member 10. Each of the jaws 13 is tapered and has an inclined surface 16 located between an adjacent pair of the axially extending slots 15. The inner outward flange unit 12 is located on the jaws 13.

The ring-mounting member 10 has a central hole 17. Each of the jaws 13 has an inner surface formed with a longitudinal rib 171 and two transverse ribs 172, which are pressed on the wheel-bearing tube 300, to facilitate firm bonding between the ring-mounting member 10 and the wheel-bearing tube 300.

As best shown in FIG. 4, an annular flange 180 project axially and inwardly from the end wall of the ring-mounting member 10 so as to define an annular groove 18 between the annular flange 180 and the peripheral wall of the ring-mounting member 10. As illustrated, the annular flange 180 has a tapered edge 181 and several axially extending grooves 182 (only one is shown). Because the wheel-bearing tube 300 is pressed from a metal sheet and then welded, a weld joint 301 (see FIG. 2) is left on the inner surface of the tube 300. The open outer end of the wheel-bearing tube 300 is received within the annular groove 18, in such a manner that the weld joint 301 is received within one of the axially extending grooves 182. The tapered edge 181 can assist the tube 300 in moving into the annular groove 18.

Referring again to FIGS. 2 and 4, the retaining ring 20 has a central hole 21, a large-diameter end section of uniform inner diameter with an internal thread unit 22 for engaging the external thread unit 14 of the ring-mounting member 10 so as to fasten the retaining ring 20 on the ring-mounting member 10, and an inclined pressing section 23 which extends from the end section and which increases gradually in inner diameter from the end section so as to press the jaws 13 of the ring-mounting member 10 against the wheel-bearing tube 300, thus clamping the wheel-bearing tube 300 within the jaws 13.

The rotatable wheel ring 200 has a small-diameter inner wall section 201, a large-diameter inner wall section 202, an intermediate-diameter inner wall section 203, a first shoulder 202a defined between the wall sections 201 and 202, and a second shoulder 203a defined between the wall sections 201 and 203. The small-diameter wall section 201 is sleeved on the small flanges 111 of the ring-mounting member 10 between the outward flange units 11 and 12, in such a manner that the shoulders 202a and 203a abut against the outward flange units 12 and 11, respectively. The small flanges 111 reduce the friction between the rotatable wheel ring 200 and the ring-mounting member 10 so as to facilitate relative rotation therebetween. As illustrated, the inner diameter of the small-diameter inner wall section 201 of the rotatable wheel ring 200 is slightly smaller than the outer diameters of the outward flange units 11 and 12 of the ring-mounting member 10, thus retaining the rotatable wheel ring 200 on the ring-mounting member 10.

Figure 3:
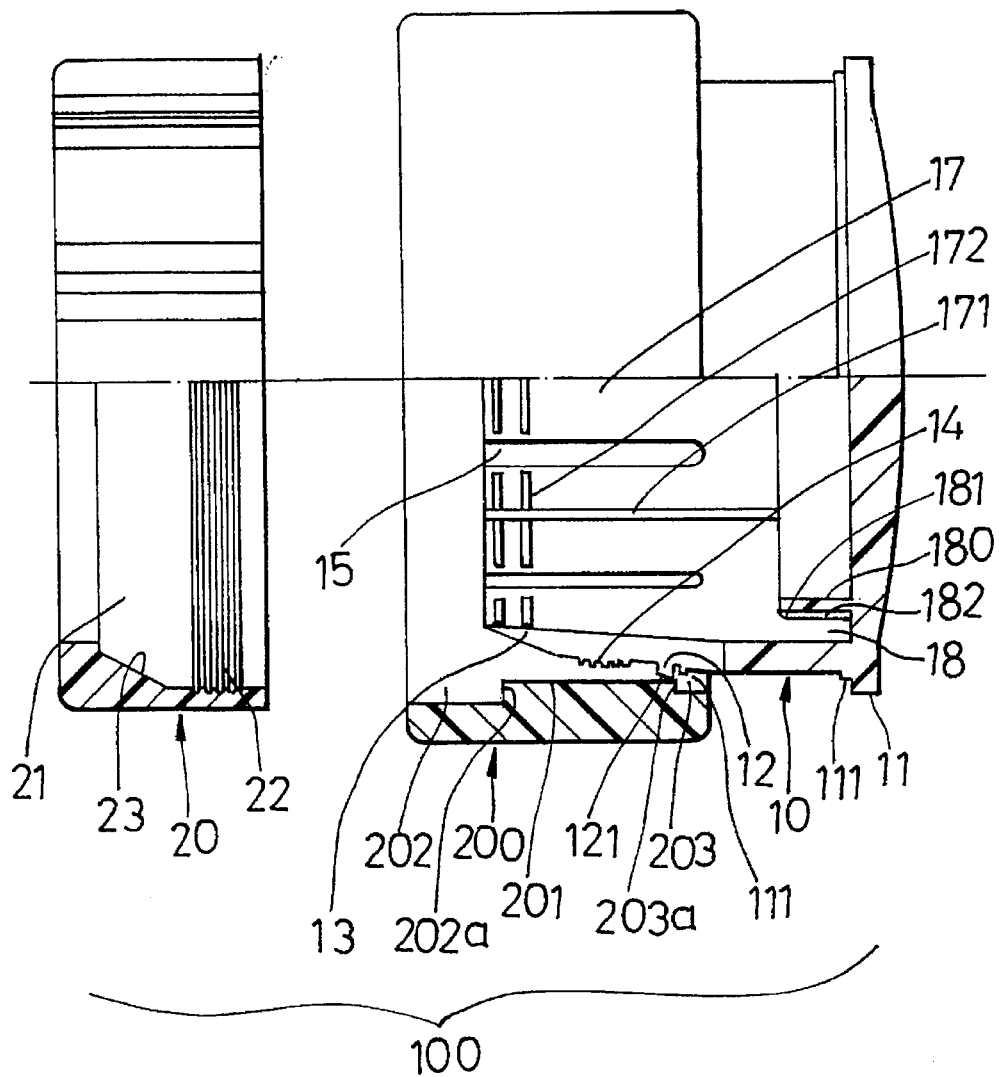
FIG. 3 is a schematic, partly sectional view illustrating how the rotatable wheel ring is sleeved onto a ring-mounting member of the rotatable wheel assembly in accordance with this invention.

During assembly of the rotatable wheel ring 200 and the ring-mounting member 10, as illustrated in FIG. 3, the rotatable wheel ring 200 is sleeved on the jaws 13 of the ring-mounting member 10 and is slid over the inclined peripheral surface 121 of the inner outward flange unit 12 so as to compress the inner outward flange unit 12 and the jaws 13 accordingly due to the fact that the inner outward flange unit 12 is located on the jaws 13. Thus, the rotatable wheel ring 200 can be easily moved into the ring-mounting space of the ring-mounting member 10 between the outward flange units 11 and 12.

Figure 5:
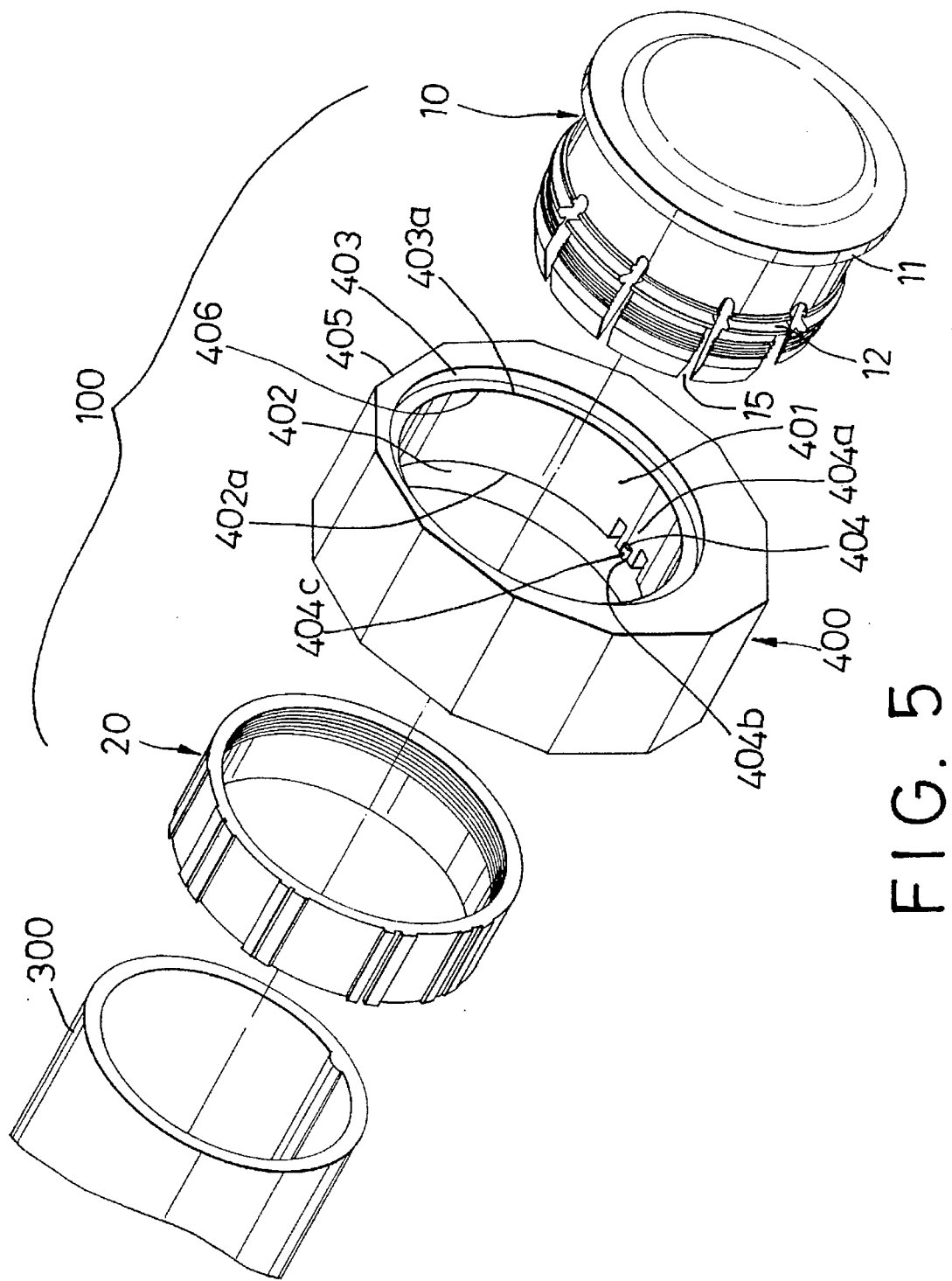
FIG. 5 is an exploded view of a fixed wheel assembly for an exerciser according to this invention, the wheel assembly being provided with a fixed wheel ring.
Figure 6:
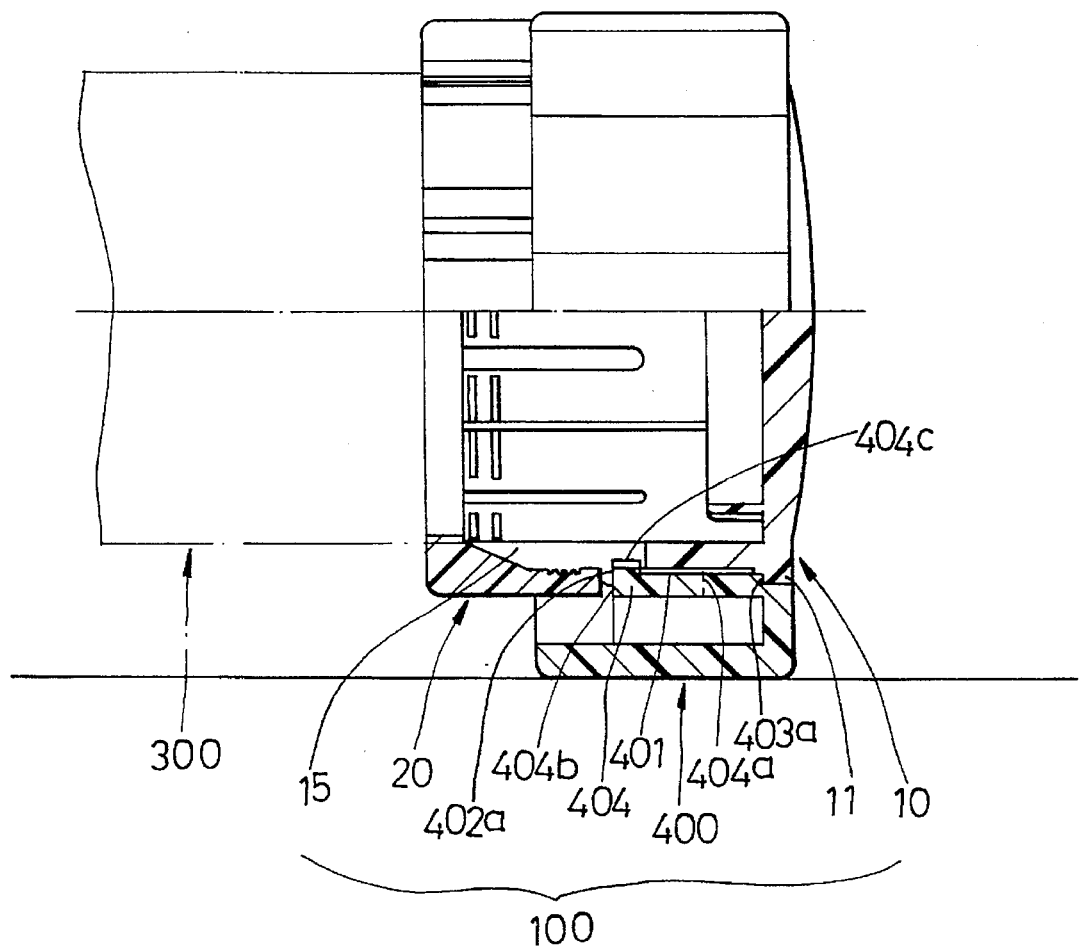
FIG. 6 is a schematic, partly sectional view showing the wheel assembly provided with the fixed wheel ring.

The rotatable wheel ring 200 may be replaced with a fixed wheel ring 400, as shown in FIGS. 5 and 6, so as to constitute a fixed wheel assembly. As illustrated, the fixed wheel ring 400 has a small-diameter inner wall section 401, a large-diameter inner wall section 402, an intermediate-diameter inner wall section 403, a first shoulder 402a defined between the wall sections 401 and 402, and a second shoulder 403a defined between the wall sections 401 and 403. Unlike the previous embodiment, a resilient sheet 404 has an inner end 404a formed integrally on the small-diameter inner wall section 401, and an outer end 404b formed with a fixed key 404c which engages one of the axially extending slots 15 of the ring-mounting member 10, which serves as a keyway, so as to prevent relative rotation between the fixed wheel ring 400 and the ring-mounting member 10.

Figure 7:
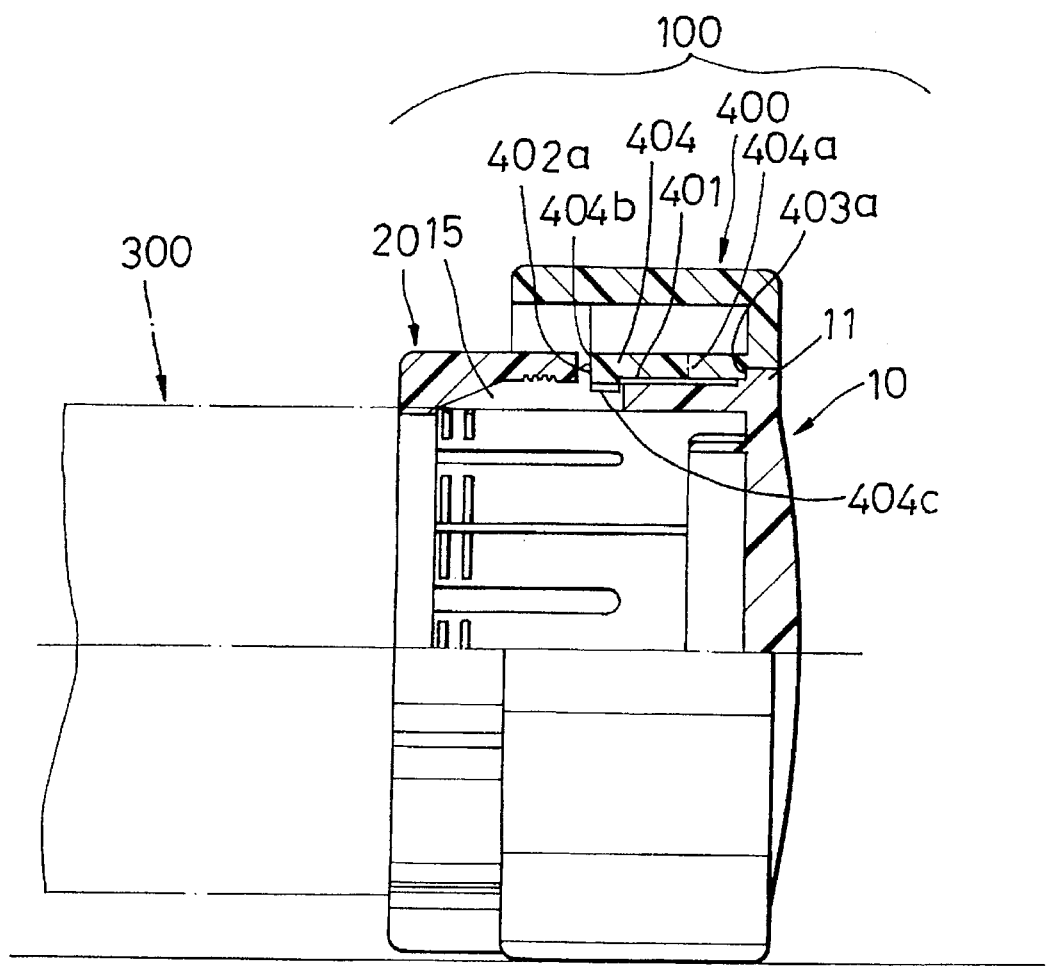
FIG. 7 illustrates adjustment of the height of the fixed wheel assembly of this invention.

As illustrated, the fixed wheel ring 400 has a regular-polygonal outer periphery 405 and a generally circular inner periphery 406 which are eccentric. Accordingly, when the key 404 of the fixed wheel ring 400 is disengaged from the axially extending slot 15 of the ring-mounting member 10, the fixed wheel ring 400 can rotate on the ring-mounting member 10 so as to engage the key 404 of the fixed wheel ring 400 within another one of the axially extending slots 15 of the ring-mounting member 10, thereby varying the distance between the lower end of the fixed wheel ring 400 and the wheel-bearing tube 300. For example, the fixed wheel ring 100 can be adjusted from the position shown in FIG. 6 to the position shown in FIG. 7 in which the distance between the lower end of the fixed wheel ring 400 and the wheel-bearing tube 300 is reduced. In this way, the exerciser provided with the fixed wheel assemblies of this invention can be placed stationarily on an uneven floor surface for use.

When it is desired to move the exerciser, which is provided with the fixed wheel assemblies of this invention, on the floor, the fixed wheel rings 400 are merely replaced with the rotatable wheel rings 200.

With this invention thus explained, it is apparent that numerous modifications and variations can be made without departing from the scope and spirit of this invention. It is therefore intended that this invention be limited only as indicated in the appended claims.

I claim:

1. A wheel assembly for an exerciser, the exerciser having a horizontal wheel-bearing tube with an open outer end, the wheel-bearing tube being pressed from a metal sheet and being formed with a weld joint, said wheel assembly comprising:

a tubular ring-mounting member having a peripheral wall, an open inner end and a closed outer end which has an end wall that is formed with an axially extending annular flange on an outer peripheral portion of an inner side surface thereof, said annular flange and said peripheral wall defining cooperatively an annular groove therebetween which is adapted to receive the open outer end of the wheel-bearing tube when the wheel-bearing tube is extended into said open inner end of said ring-mounting member, said peripheral wall having an outer outward flange unit adjacent to said closed outer end of said ring-mounting member, and an inner outward flange unit located at an intermediate portion of said ring-mounting member, said inner and outer outward flange units projecting radially and outwardly from said peripheral wall so as to define therebetween a ring-mounting space adjacent to said closed outer end of said ring-mounting member, said peripheral wall further having a plurality of axially extending slots which are formed therethrough and which are open at said open inner end of said ring-mounting member, so as to define a plurality of flexible jaws, each of said jaws being located between an adjacent pair of said axially extending slots, said inner outward flange unit being located on said jaws;

a wheel ring sleeved on said ring-mounting member between said inner and outer outward flange units and having a minimum inner diameter slightly smaller than a maximum outer diameter of said inner outward flange unit of said ring-mounting member so as to prevent removal of said wheel ring from said ring-mounting member, said inner outward flange unit being capable of being compressed due to flexibility of said jaws so as to permit entry of said wheel ring into said ring-mounting space of said ring-mounting member during assembly; and a retaining ring sleeved fixedly on said jaws of said ring-mounting member so as to be adapted to clamp the wheel-bearing tube within said jaws, thereby securing said ring-mounting member onto the wheel-bearing tube.

2. A wheel assembly as claimed in claim 1, wherein said jaws of said ring-mounting member are tapered and have an external thread unit which is adjacent to said inner outward flange unit, said retaining ring having a large-diameter end section of uniform inner diameter with an internal thread unit for engaging said external thread unit of said ring-mounting member so as to fasten said retaining ring on said ring-mounting member, and an inclined pressing section extending from said end section and increasing gradually in inner diameter from said end section so as to press against said jaws of said ring-mounting member, thus clamping the wheel-bearing tube within said jaws.

3. A wheel assembly as claimed in claim 1, wherein said inner outward flange unit increases gradually in outer diameter from an outer end away from said ring-mounting space to an inner end adjacent to said ring-mounting space, thereby defining an inclined peripheral surface of said inner outward flange unit, for assisting said wheel ring when sliding over the peripheral surface of said inner outward flange unit into said ring-mounting space.

4. A wheel assembly as claimed in claim 1, wherein said peripheral wall of said ring-mounting member further includes two axially spaced-apart small flanges projecting radially and outwardly therefrom between said inner and outer outward flange units, said small flanges having an outer diameter smaller than those of said inner and outer outward flange units so that said wheel ring is sleeved on said small flanges, thereby reducing friction between said wheel ring and said ring-mounting member when said wheel ring rotates on said ring-mounting member.

5. A wheel assembly as claimed in claim 1, wherein said annular flange has a plurality of axially extending grooves formed in an outer surface thereof and spaced apart from each other, one of said grooves being adapted to receive the weld joint of the wheel-bearing tube.

6. A wheel assembly as claimed in claim 1, wherein said wheel ring has a key which is secured to an inner surface thereof and which engages one of said axially extending slots that serves as a keyway, thereby preventing rotation of said wheel ring relative to said ring-mounting member, so as to constitute a fixed wheel assembly of the exerciser.

7. A wheel assembly as claimed in claim 6, wherein said wheel ring has a regular-polygonal outer periphery and a generally circular inner periphery which are eccentric, whereby, when said key of said wheel ring is disengaged from said one of said axially extending slots, said wheel ring can be rotated on said ring-mounting member in order to vary height of said ring-mounting member.

* * * * *